(12) United States Patent
Rosemeier et al.

(10) Patent No.: US 8,308,600 B2
(45) Date of Patent: Nov. 13, 2012

(54) TRANSMISSION DEVICE COMPRISING AT LEAST TWO OUTPUT SHAFTS AND AT LEAST TWO MULTI-SHAFT PLANETARY GEAR SETS

(75) Inventors: Thomas Rosemeier, Meckenbeuren (DE); Bernd-Robert Hohn, Munich (DE); Christoph Pelchen, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 391 days.

(21) Appl. No.: 12/808,513

(22) PCT Filed: Dec. 8, 2008

(86) PCT No.: PCT/EP2008/066979
§ 371 (c)(1),
(2), (4) Date: Jun. 16, 2010

(87) PCT Pub. No.: WO2009/080474
PCT Pub. Date: Jul. 2, 2009

(65) Prior Publication Data
US 2010/0323838 A1     Dec. 23, 2010

(30) Foreign Application Priority Data

Dec. 20, 2007 (DE) .......................... 10 2007 055 882

(51) Int. Cl.
*F16H 37/08* (2006.01)
*F16H 48/30* (2006.01)

(52) U.S. Cl. ........................................ 475/204; 475/150

(58) Field of Classification Search .................... 475/18, 475/28, 29, 30, 149, 150, 203, 204, 205, 475/303; 180/246, 247
See application file for complete search history.

(56) References Cited

U.S. PATENT DOCUMENTS 5,437,583 A      8/1995   Shibahata et al.
(Continued)

FOREIGN PATENT DOCUMENTS

DE       44 08 587 A1      10/1994
(Continued)

OTHER PUBLICATIONS

English translation of DE102006031089, http://translationportal.epo.org, Aug. 29, 2012.*

*Primary Examiner* — Roger Pang
(74) *Attorney, Agent, or Firm* — Davis & Bujold PLLC (57) ABSTRACT

A transmission device with at least two output shafts and at least two multi-shaft planetary gearsets being actively connected. A shaft of each gearset can be actively connected with an output shaft. A shifting mechanism is provided, between the two output shafts, for shifting between a first power path and a second power path. In the area of a further shaft of one of the planetary gearsets, torque from an electric machine flows along the first or the second power path. When the first power path is engaged, the torque from the electric machine flows in equal parts and with the same sign to the two output shafts, and when the second power path is engaged, the torque flows to the two output shafts in equal parts but with opposite signs. A motor output shaft of the electric machine is arranged perpendicularly to one of the two output shafts.

9 Claims, 5 Drawing Sheets

| U.S. PATENT DOCUMENTS | | | |
|---|---|---|---|
| 5,497,845 A * | 3/1996 | Shibahata | 180/76 |
| 6,098,737 A | 8/2000 | Aoki | |
| 7,156,766 B2 | 1/2007 | Gassmann | |
| 7,491,146 B2 | 2/2009 | Sharma et al. | |
| 7,503,416 B2 * | 3/2009 | Sharma et al. | 180/247 |
| 7,651,426 B2 | 1/2010 | Yokoyama et al. | |
| 8,172,712 B2 * | 5/2012 | Jarzyna et al. | 475/204 |
| 2007/0249456 A1 | 10/2007 | Meixner | |
| 2009/0118051 A1 * | 5/2009 | Bock et al. | 475/205 |

| FOREIGN PATENT DOCUMENTS | | |
|---|---|---|
| DE | 103 29 770 A1 | 2/2005 |
| DE | 10 2005 021 023 A1 | 11/2006 |
| DE | 10 2006 022 175 A1 | 11/2007 |
| DE | 10 2006 031 089 A1 | 1/2008 |
| EP | 0 224 144 A1 | 6/1987 |
| EP | 1 787 846 A1 | 5/2007 |
| WO | 2005/110790 A2 | 11/2005 |
| WO | 2007/002743 A2 | 1/2007 |

* cited by examiner

TRANSMISSION DEVICE COMPRISING AT LEAST TWO OUTPUT SHAFTS AND AT LEAST TWO MULTI-SHAFT PLANETARY GEAR SETS

This application is a National Stage completion of PCT/EP2008/066979 filed Dec. 8, 2008, which claims priority from German patent application Ser. No. 10 2007 055 882.3 filed Dec. 20, 2007.

FIELD OF THE INVENTION

The invention concerns a transmission device with at least two output shafts and with at least two multi-shaft planetary gearsets in active connection with one another.

BACKGROUND OF THE INVENTION

A drive device for motor vehicles, for driving a vehicle axle of a motor vehicle with two wheels in active connection with one another via two planetary gearsets is known from DE 10 2006 031 089.6. The first planetary gearset is designed as a so-termed stepped planetary gearset with stepped planetaries, whereas the second planetary gearset is a so-termed positive planetary gearset with shiftable reversing stages. In each case a shaft of a planetary gearset can be brought into active connection with a driveshaft connected to a wheel or with an output shaft of the drive device. Moreover a shifting mechanism is provided, by means of which a first power path or a second power path between the wheels of the vehicle axle can be engaged.

In the area of a further shaft of the planetary gearsets, torque of an electric machine can be passed into the first or the second power path. The torque of the electric machine can be transferred in equal parts and with the same sign to the output shafts or wheels of the vehicle axle when the first power path is engaged, and in equal parts but with opposite signs when the second power path is engaged, in order, during a first operating mode, to provide a drive torque in the area of the vehicle axle, or during a second operating mode, to improve the driving behavior of a motor vehicle by distributing the torque produced by the electric machine in equal parts but with opposite signs between the wheels of the vehicle axle and transmit them thereto.

The electric machine is arranged coaxially with a driveshaft connected to a carrier of the stepped planetary gearset, by means of which torque can be transmitted to one of the drive wheels of the vehicle axis, and between the stepped planetary gearset and the drive wheel in an area of a motor vehicle in which the structural space available for fitting an electric machine is limited. For that reason the drive device can disadvantageously only be made with electric machines which take up no more space than is available and whose power is therefore insufficient for various requirements.

SUMMARY OF THE INVENTION

Accordingly, the purpose of the present invention is to make available a transmission device with at least two output shafts, and at least two multi-shaft planetary gearsets in active connection with one another, with which both of the operating modes described above can be produced and which can be combined with electric motors which provide sufficient power to enable the operating modes to be implemented.

The transmission device according to the invention is made with at least two output shafts and with at least two multi-shaft planetary gearsets in active connection with one another. In each case a shaft of a planetary gearset can be brought into active connection with an output shaft of the transmission device. In addition a shifting device is provided, by means of which a shift can be carried out between a first power path and a second power path between the output shafts of the transmission device, and in the area of a further shaft of one of the planetary gearsets torque of an electric machine can be passed into the first or the second power path. The torque of the electric machine is passed in equal parts and with the same sign to the output shafts when the first power path is engaged, and in equal parts but with opposite signs when the second power path is engaged. An output shaft of the electric machine is arranged perpendicularly to one of the output shafts of the transmission device.

Thus, the electric machine of the transmission device according to the invention can be arranged away from an area between one of the planetary gearsets of the transmission device and a drive wheel of a vehicle where the structural space is restricted, in an area where the structural space is less restricted. In a simple and inexpensive manner the transmission device according to the invention can then be combined with electric machines which are large enough to provide the power necessary for producing the two operating modes, i.e. the drive mode or the torque-vectoring mode.

Below, the term negative planetary gearset or negative transmission is understood to mean a planetary transmission with a negative fixed transmission ratio. On the other hand, a positive planetary gearset or positive transmission is a planetary transmission with a positive fixed transmission ratio, the fixed transmission ratio being the ratio between the angular speeds or rotational speeds of the central wheel shafts in a planetary transmission when the carrier is stationary or is assumed to be stationary.

BRIEF DESCRIPTION OF THE DRAWINGS

Further advantages and advantageous further developments of the invention emerge from the claims and from the example embodiments whose principle is described with reference to the drawing; for the sake of clarity, in the description of the example embodiments the same indexes are used to denote components having the same structure and function:

DETAILED DESCRIPTION OF THE PREFERRED EMBODIMENTS

Figure 1:
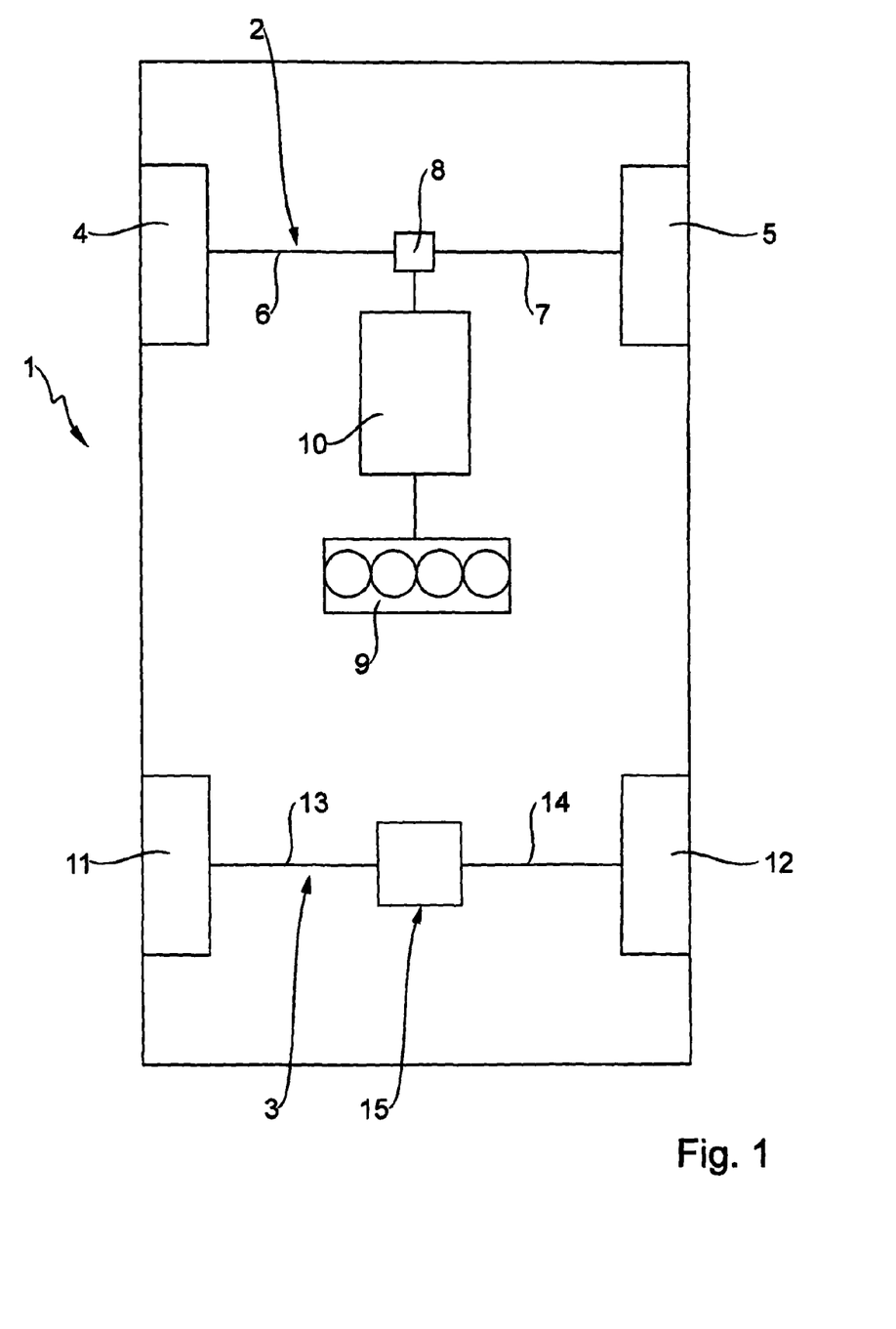
FIG. 1: Very basic schematic representation of a vehicle constructed with the transmission device according to the invention in the area of a rear vehicle axle

FIG. 1 shows a very basic schematic representation of a vehicle 1 with a first vehicle axle 2 and a second vehicle axle 3, the first vehicle axle 2 being a front vehicle axle and the second vehicle axle 3 being a rear vehicle axle of the vehicle 1. The first vehicle axle 2 has two drive wheels 4, 5 which are connected by two driveshafts 6, 7 to a differential transmission unit 8. By means of the differential transmission unit 8, drive torque, produced by a drive assembly 9 in this case in the form of an internal combustion engine, is distributed in equal parts to the two drive wheels 4 and 5. In addition, between the drive assembly 9 and the differential transmission unit 8 a transmission device 10 is provided, which can be made as a manual shift transmission, an automatic transmission or an automated transmission and by means of which, in a manner known per se, various continuously adjustable transmission ratios or transmission ratio steps can be produced.

The second vehicle axle 3 also has two drive wheels 11, 12, which are in active connection with one another via two driveshafts 13, 14 and a transmission device 15, in order to make available in the area of the second vehicle axle 3 a torque in the area of the drive wheels 11, 12 during a drive mode, or, during a torque-vectoring operating mode, in order to influence the driving behavior in a positive manner. With the transmission device 15 deactivated the vehicle 1 according to FIG. 1 is front-wheel-driven, whereas when the transmission device 15 is in the drive mode, the vehicle 1 is powered in the area of both vehicle axles and thus corresponds to a four-wheel-drive vehicle. If the drive unit 9 is deactivated, i.e. the internal combustion engine is static, the activated transmission device 15 can power the vehicle. If for example the drive motor of the transmission device is an electric motor, the vehicle can be driven under electric power (hybrid drive). The prerequisite for this is an appropriately designed energy store. In the torque-vectoring operating mode of the transmission device 15, the vehicle 1 is powered in the area of the front vehicle axle and the driving behavior is influenced by means of an "active" rear vehicle axle.

Figure 2:
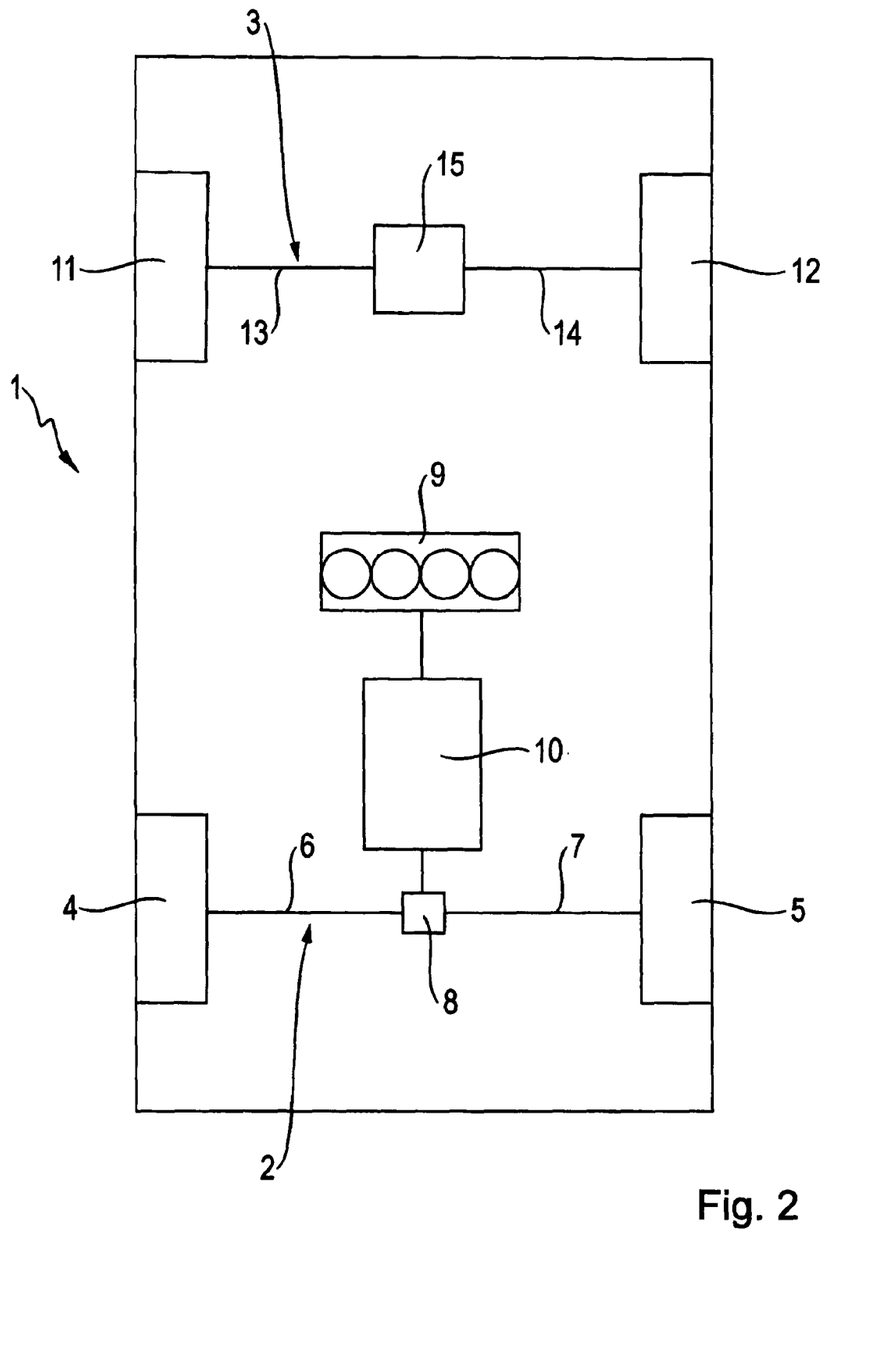
FIG. 2: Representation of a vehicle corresponding to FIG. 1, constructed with the transmission device according to the invention in the area of a front vehicle axle

In the second example embodiment of the motor vehicle 1 shown in FIG. 2, the first vehicle axle 2 is the rear axle and the second vehicle axle 3 is the front axle of the motor vehicle 1, so when the transmission device 15 is inactive the vehicle is a purely rear-wheel-drive vehicle. In the drive mode of the transmission device 15, the vehicle 1 of FIG. 2, like the vehicle in FIG. 1, is powered in the area of both vehicle axles 2 and 3. In the torque-vectoring operating mode of the transmission device 15, the driving behavior of the vehicle 1 is influenced not only by the rear-wheel drive but also by the "active" front axle of the vehicle.

Figure 3:
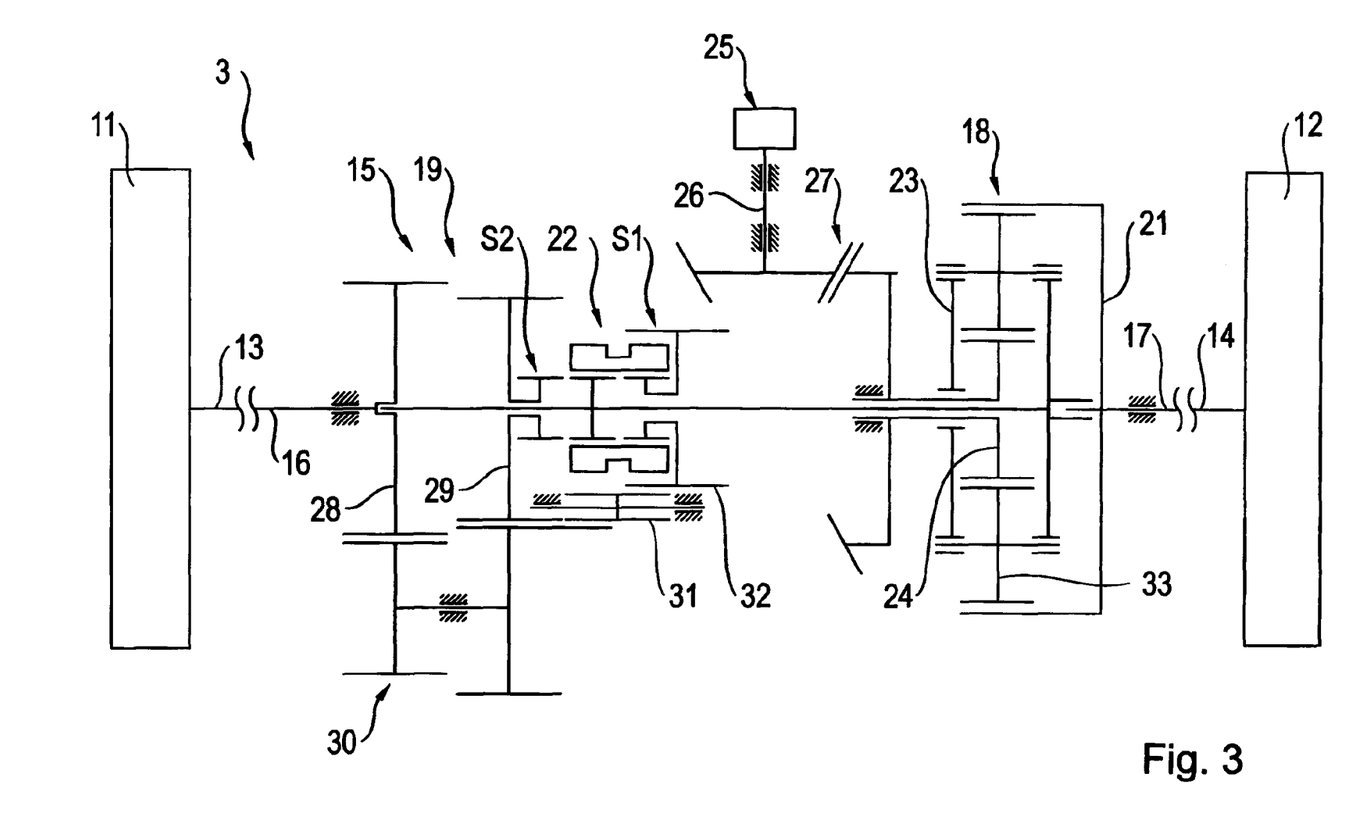
FIG. 3: Wheel layout of a first example embodiment of the transmission device according to FIGS. 1 and 2
Figure 4:
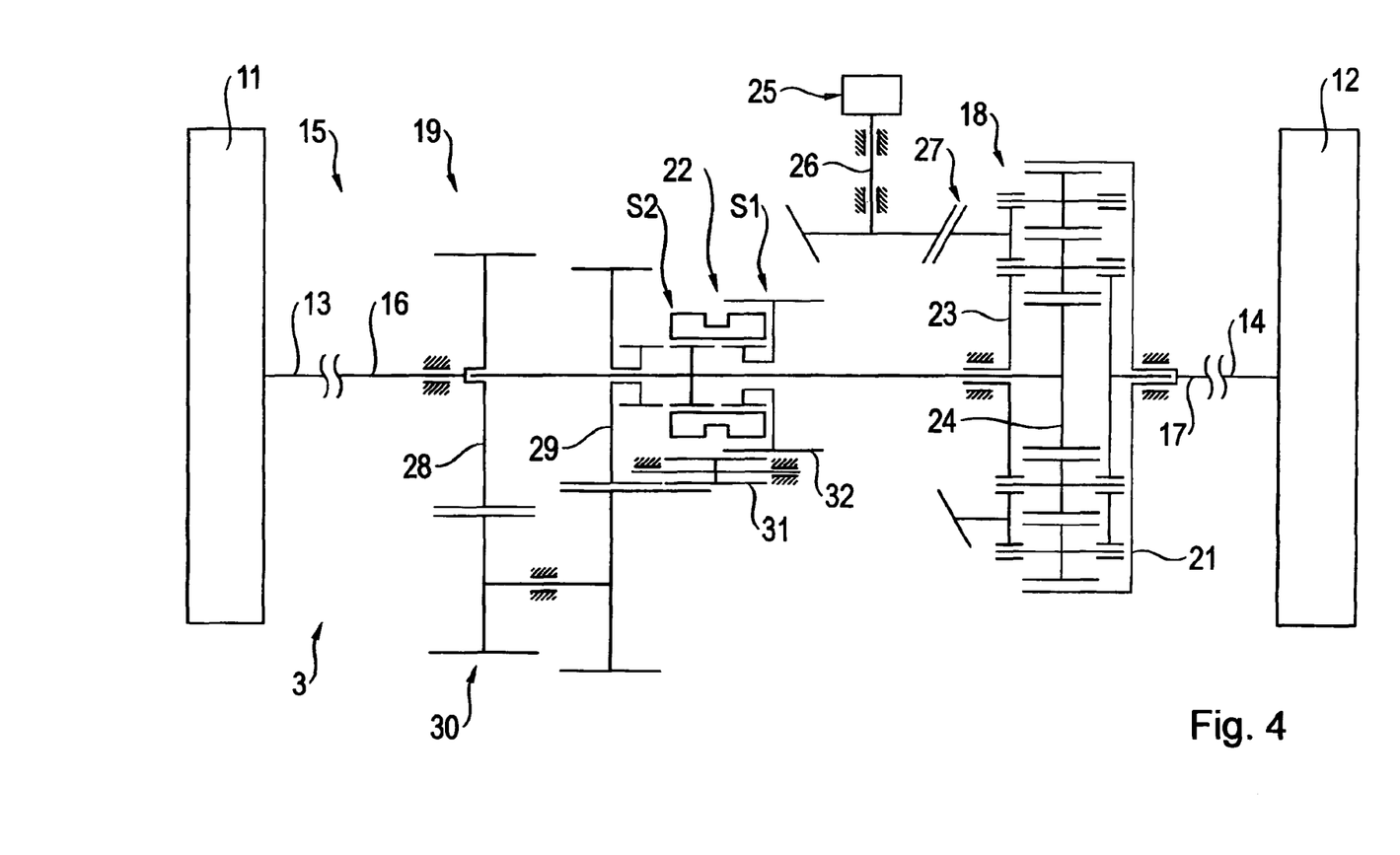
FIG. 4: Wheel layout of a second example embodiment of the transmission device according to FIGS. 1 and 2
Figure 5:
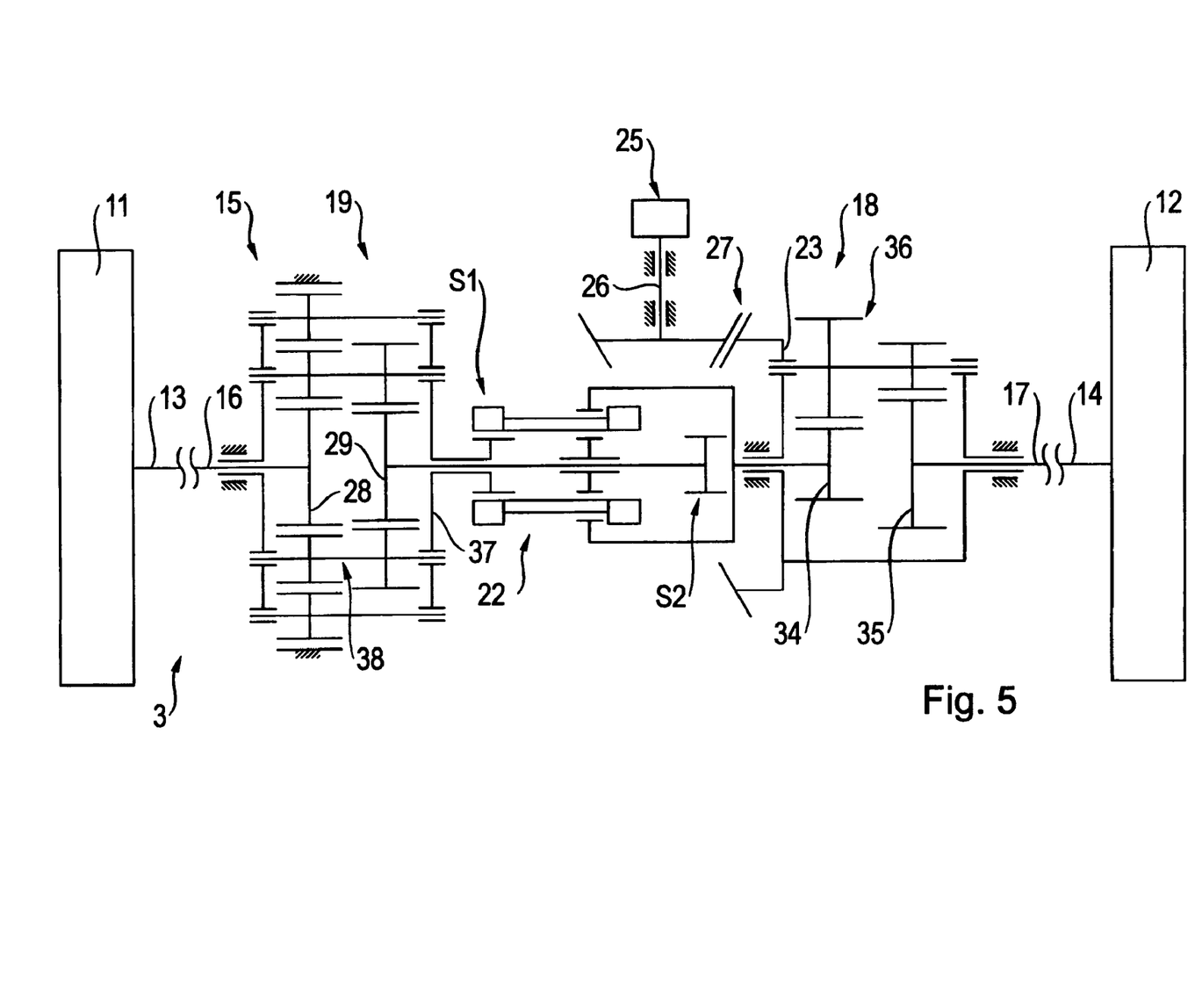
FIG. 5: A third embodiment of the transmission device according to FIGS. 1 and 2 with a positive planetary gearset

FIGS. 3 to 5 show a number of wheel layouts of various example embodiments of the transmission device 15 according to FIGS. 1 and 2, which have a common basic structure for producing the drive mode and the torque-vectoring operating mode.

Thus, the transmission devices 15 in FIGS. 3 to 5 are in each case formed with two output shafts 16, 17 and with two multi-shaft planetary gearsets 18, 19 in active connection with one another. In the example embodiments of the transmission device 15 shown in FIGS. 3 to 5, in each case a shaft 28 of a second planetary gearset 19, made as a sun gear, is connected to the output shaft 16. The output shaft 17 of the example embodiments of the transmission device 15 shown in FIGS. 3 and 4 is in each case connected to a shaft 21 of the first planetary gearset 18 made as a hollow shaft, whereas the output shaft 17 in the example embodiment of the transmission device 15 shown in FIG. 5 is connected to a shaft 35 of the first planetary gearset 18 made as a sun gear.

In addition, in all the example embodiments of the transmission device 15 shown in the drawings, a shifting mechanism 22 is arranged between the two planetary gearsets 18 and 19, which can be switched between two different operating conditions or shift positions S1 and S2 and which connects the two output shafts 16 and 17 of the transmission device 15 to one another via a first power path or a second power path of the transmission 15.

In the transmission device 15 according to FIG. 3, in the area of a sun gear 24 of the first planetary gearset 18, and in the transmission device 15 according to FIGS. 4 and 5, in the area of a carrier 23 of the first planetary gearset 18, torque of an electric machine 25 can be passed into the first or the second power path of the transmission device 15, in such manner that when the first power path is engaged the torque of the electric machine 25 is distributed between the output shafts 16, 17 and transmitted to them in equal parts and with the same sign, but when the second power path is engaged the torque is distributed and transmitted in equal parts but with different signs.

In the example embodiment shown in FIG. 3 the first planetary gearset 18 is made as a simple negative planetary gearset, while the second planetary gearset 19 is a positive planetary gearset. In the transmission device 15 shown in FIG. 4 the first planetary gearset 18 is a double planetary gearset and the second planetary gearset 19 is a positive planetary gearset, while the first planetary gearset 18 of the transmission device 15 shown in FIG. 5 is a positive planetary gearset and the second planetary gearset 19 is a double planetary gearset.

Basically, in all the example embodiments of the transmission device 15 shown in the drawing the drive mode can be obtained when the shifting mechanism 22 is in its first shift position S1. This makes it possible to use the vehicle 1 both in traction and in thrust operation, and particularly during thrust operation of the vehicle braking energy can be recovered while the electric machine 25 is operating as a generator.

If the shifting mechanism 22 is switched to its second shift position S2, the transmission device 15 transfers a torque provided by the electric machine 25 to the drive wheels 11 and 12 in equal parts but with opposite signs, and thereby accelerates one of the drive wheels 11 or 12 while the other drive wheel 12 or 11 is braked to the same extent. Thus, in the area of the second vehicle axle 3 a so-termed torque-vectoring is carried out in order to be able, in a manner known per se, to improve the driving stability of the vehicle 1 and achieve more agile behavior of the vehicle 1 while driving round a curve.

In all the example embodiments of the transmission device 15 shown in the drawing the electric machine 25 or a motor output shaft 26 of the electric machine 25 is arranged perpendicularly to the output shafts 16 and 17 of the transmission device 15. Between the sun gear 24 of the first planetary gearset 18 of the transmission device 15 according to FIG. 3 or the carrier 23 of the first planetary gearset 18 of the transmission device 15 in FIGS. 4 and 5, and the electric machine 25 or its motor output shaft 26, in each case a bevel gear stage 27 is provided. Thus, the electric machine 25 or its motor output shaft 26 is arranged rotated at an angle of 90° relative to the wheel axle and can be positioned in an area of a vehicle where sufficient structural space is available for it.

The second planetary gearset 19 of the transmission device 15 in FIG. 3 is made with two sun gears 28, 29 having different respective tooth numbers, which mesh with stepped planetary gears 30. To reverse the torque direction, this example embodiment is provided with an additional planetary gear 31 and with a further sun gear 32, which in the first shift position S1 of the shifting mechanism 22 is in active connection with the carrier 23 of the first planetary gearset 18. The second planetary gearset 19 in FIG. 3 is designed such that in the first shift position S1 of the shifting mechanism 22 its gearing efficiency is approximately 97% and part of the torque produced by the electric machine 25 is transferred in the area thereof via three tooth engagements arranged next to one another in the axial direction.

In the first shift position S1 of the shifting mechanism 22, the torque to be supported in the area of the housing of the transmission device 15 is transferred to the housing of the transmission device 15 by the mounting of the stepped planetary gears 30 of the second planetary gearset 19.

In the second shift position S2 of the shifting mechanism 22 the second sun gear 29 is connected to the carrier 23 of the first planetary gearset 18, so that half the torque of the electric machine 25 is transmitted from the motor output shaft 26, via the bevel gear stage 27, the sun gear 24 of the first planetary gearset 18 and planetary gears 33 meshing with it, and the carrier 23 of the first planetary gearset 18, via the second sun gear 29 of the second planetary gearset 19 and the stepped planetary gears 30 that mesh with it, to the first sun gear 28 of the second planetary gearset 19 and from there, via the output shaft 16 and the driveshaft 13, to the drive wheel 11. The other half of the torque provided by the electric machine 25 is passed on by the planetary gears 33 of the first planetary gearset 18 and the ring gear 21 that meshes with them, via the output shaft 17 and the driveshaft 14, to the drive wheel 12.

The second embodiment of the transmission device 15, shown in FIG. 4, differs from the example embodiment of the transmission device 15 according to FIG. 3 essentially in the area of the first planetary gearset 18, which in the transmission device 15 according to FIG. 4 is made as a double planetary gearset or a positive planetary gearset in order to be able to connect the electric machine 25 via the bevel gear stage 27 to the carrier 23 of the first planetary gearset 18. The sun gear 24 of the first planetary gearset 18 is connected to the second planetary gearset 19 by shifting.

In the transmission device 15 according to FIG. 4 the shafts running in the area of the shifting mechanism 22 and in the area between the two planetary gearsets 18 and 19 carry smaller torques than in the transmission device 15 according to FIG. 3, although the speeds in these areas are higher in the transmission device 15 of FIG. 4 than in the transmission device 15 of FIG. 3.

In the transmission device 15 shown in FIG. 5 the first planetary gearset 18 is made as a positive planetary gearset with a first sun gear 34 and a second sun gear 35, which mesh with stepped planetary gears 36. The second planetary gearset 19 of the transmission device 15 is made as a double planetary gearset and, besides a rotationally fixed ring gear, comprises the shaft 16 made as a sun gear 28 and a second sun gear 29, the two sun gears 28 and 29 having different numbers of teeth.

In the first shift position S1 of the shifting mechanism 22 the first sun gear 34 of the first planetary gearset 18 is connected by means of the shifting mechanism 22 to a carrier 37 of the second planetary gearset 19. In the second shift position S2 the first sun gear 34 of the first planetary gearset 18 is coupled by the shifting mechanism 22 with the second sun gear 29 of the second planetary gearset 19 and is engaged in the second power path of the transmission device 15.

During the operation of the transmission device 15 according to FIG. 5, in the area of the double planetary gears 38 of the second planetary gearset lower relative planetary rotation speeds occur that in the example embodiment of the transmission device 15 according to FIG. 4. In addition, the second planetary gearset 19 of the transmission device 15 in FIG. 5 has only two tooth engagements arranged axially next to one another, so the gearing efficiency of the second planetary gearset 19 in FIG. 5 is higher than the gearing efficiency of the second planetary gearset 19 in FIGS. 3 and 4.

In addition, compared with the transmission device 15 according to FIG. 4, during the operation of the transmission device 15 in FIG. 5 smaller torques act in the area of the shifting mechanism 22, so the loads in the area of the shifting mechanism 22 are lower and the shifting forces that have to be exerted in order to move the shifting mechanism 22 are smaller.

On the other hand, in the area of the second planetary gearset 19 the transmission device 15 according to FIG. 5 is more complex and costly to produce owing to the stepped design of the inner planetary gears 38 than the second planetary gearset 19 according to FIG. 4. Moreover, in the area of the stepped double planetary gears 38 of the second planetary gearset 19 of the transmission device 15 in FIG. 5, axial forces that occur during operation of the transmission device 15 have to be supported.

With the transmission device according to the invention, both the drive mode and the torque-vectoring mode can be implemented by a single system characterized by limited need for structural space, low overall weight, and lower manufacturing costs.

Basically, the transmission device according to the invention is characterized by multi-functionality with only one electric motor. In the various operating modes of the transmission device according to the invention with its compact structure and low inherent weight, appropriate transmission ratios can in each case be provided. Furthermore, the transmission device can be produced inexpensively and can be operated with high efficiency at any operating point.

Indexes
1 Vehicle
2 First vehicle axle
3 Second vehicle axle
4, 5 Drive wheel
6, 7 Driveshaft
8 Differential transmission unit
9 Drive assembly
10 Transmission device
11, 12 Drive wheel
13, 14 Driveshaft
15 Transmission device
16, 17 Output shaft
18 First planetary gearset
19 Second planetary gearset
21 Ring gear of the first planetary gearset
22 Shifting mechanism
23 Carrier of the first planetary gearset
24 Sun gear of the first planetary gearset
25 Electric machine
26 Motor output shaft of the electric machine
27 Bevel gear stage
28 First sun gear of the second planetary gearset
29 Second sun gear of the second planetary gearset
30 Stepped planetary gear of the second planetary gearset
31 Additional planetary gear
32 Further sun gear
33 Planetary gears of the first planetary gearset
34 First sun gear of the first planetary gearset
35 Second sun gear of the first planetary gearset
36 Stepped planetary gears of the first planetary gearset
37 Carrier of the second planetary gearset
38 Stepped double planetary gears of the second planetary gearset

The invention claimed is:

1. A transmission device (15) comprising:
at least two transmission output shafts (16, 17) and at least first and second multi-shaft planetary gearsets (18, 19) in active connection with one another such that, in each case, a shaft (21, 28; 23, 28) of one of the first and the second multi-shaft planetary gearsets (18, 19) is actively connectable with one of the two transmission output shafts (16, 17),
a shifting mechanism (22), for shifting between a first power path and a second power path, being provided between the two transmission output shafts (16, 17) such that, in an area of a further shaft (23) of one of the first and the second multi-shaft planetary gearsets(18), torque from an electric machine (25) flows along one of the first and the second power paths in such a manner that when the first power path is engaged, the torque from the electric machine (25) flows in equal parts and with the same sign to the two transmission output shafts (16, 17), whereas when the second power path is engaged, the torque from the electric machine (25) flows to the two transmission output shafts (16, 17) in equal parts but with opposite signs, and a motor output shaft (26), of the electric machine (25), being arranged perpendicularly to one of the two transmission output shafts (16, 17).

2. The transmission device according to claim 1, wherein the first planetary gearset (18), to which the torque from the electric machine (25) flows, is a simple negative planetary gearset.

3. The transmission device according to claim 1, wherein the second planetary gearset (19) is a positive planetary gearset.

4. The transmission device according to claim 1, wherein the first planetary gearset (18), to which the torque from the electric machine (25) flows, is a double planetary gearset.

5. The transmission device according to claim 4, wherein the second planetary gearset (19) is a positive planetary gearset.

6. The transmission device according to claim 1, wherein the first planetary gearset (18), to which the torque from the electric machine (25) flows, is a positive planetary gearset.

7. The transmission device according to claim 6, wherein the second planetary gearset (19) is a double planetary gearset.

8. The transmission device according to claim 1, wherein the shifting mechanism (22) is arranged between the first and the second multi-shaft planetary gearsets(18, 19).

9. A transmission device (15) comprising:
at least two transmission output shafts (16, 17);
at least first and second multi-shaft planetary gearsets (18, 19) actively connected with one another, each of the first and the second multi-shaft planetary gearsets (18, 19) comprises a shaft (21, 28; 23, 28) that is actively connectable with one of the two transmission output shaft (16, 17);
an electric machine (25) having an output shaft (26) that is aligned perpendicular to at least one of the two transmission output shafts (16, 17), the output shaft (26) of the electric machine (25) transmitting torque from the electric machine (25) to the first and the second multi-shaft planetary gearsets (18, 19);
a shifting mechanism (22) being located between the two transmission output shafts (16, 17), the shifting mechanism (22) facilitating a shift between a first power path and a second power path such that torque flows from the output shaft (26) of the electric machine (25), via a further shaft (23) of one of the first and the second multi-shaft planetary gearsets (18, 19), to one of the first or the second power paths;
in the first power path, each of the two transmission output shafts (16, 17) being driven with an approximately equal amount of torque with the same sign; and
in the second power path, each of the two transmission output shafts (16, 17) being driven with an approximately equal amount of the torque but the torque on a first of the two transmission output shafts (16, 17) having a positive sign while torque on a second of the two transmission output shafts (16, 17) having a negative sign.

* * * * *